(12) United States Patent
Kim et al.

(10) Patent No.: US 9,880,686 B2
(45) Date of Patent: Jan. 30, 2018

(54) TOUCH SCREEN PANEL, DISPLAY DEVICE, AND MANUFACTURING METHOD THEREOF

(71) Applicants:Samsung Display Co., Ltd., Yongin-si (KR); IUCF-HYU (Industry-University Cooperation Foundation Hanyang-University), Seoul (KR)

(72) Inventors: Seung Hun Kim, Yongin-si (KR); Cheol Jang, Yongin-si (KR); Sang Hwan Cho, Yongin-si (KR); Chung Sock Choi, Yongin-si (KR); Myung Mo Sung, Seoul (KR)

(73) Assignees: Samsung Display Co., Ltd., Yongin-si (KR); IUCF-HYU, Seoul (KR)

( * ) Notice: Subject to any disclaimer, the term of this patent is extended or adjusted under 35 U.S.C. 154(b) by 48 days.

(21) Appl. No.: 14/861,546

(22) Filed: Sep. 22, 2015

(65) Prior Publication Data

US 2016/0209955 A1 Jul. 21, 2016

(30) Foreign Application Priority Data

Jan. 20, 2015 (KR) ........................ 10-2015-0009466

(51) Int. Cl.
*G06F 3/044* (2006.01)

(52) U.S. Cl.
CPC .... *G06F 3/044* (2013.01); *G06F 2203/04103* (2013.01); *G06F 2203/04111* (2013.01)

(58) Field of Classification Search
CPC ........... G06F 3/044; G06F 2203/04111; G06F 2203/04103; G06F 3/045; G06F 3/041; G06F 3/03547; G06F 3/0412
See application file for complete search history.

(56) References Cited

U.S. PATENT DOCUMENTS

2005/0130413 A1* 6/2005 Shimoto ............. H01L 21/4857
438/637
2011/0081478 A1 4/2011 Mochizuki et al.
2011/0262631 A1* 10/2011 Lee ........................ G06F 3/044
427/123

(Continued)

FOREIGN PATENT DOCUMENTS

JP 2013538126 10/2013
KR 1020060126959 12/2006

*Primary Examiner* — Gerald Johnson
(74) *Attorney, Agent, or Firm* — H.C. Park & Associates, PLC

(57) ABSTRACT

A touch screen panel includes first electrode patterns disposed in a first direction, first connection patterns electrically connecting the first electrode patterns, second electrode patterns disposed in a second direction intersecting the first direction and insulated from the first electrode patterns, insulating patterns disposed on the first connection patterns, and second connection patterns disposed on the insulating patterns and electrically connecting the second electrode patterns, in which at least one of the first electrode patterns, the first connection patterns, the second electrode patterns, and the second connection patterns include a first polymer layer including a conductive material infiltrated therein, and the insulating patterns comprise a second polymer layer comprising a dielectric material infiltrated therein.

20 Claims, 6 Drawing Sheets

(56) References Cited

U.S. PATENT DOCUMENTS

| | | | |
|---|---|---|---|
| 2012/0012370 A1* | 1/2012 | Nashiki | G06F 3/045 174/255 |
| 2013/0184503 A1 | 7/2013 | Frania et al. | |
| 2014/0104509 A1 | 4/2014 | Fang et al. | |
| 2015/0107885 A1* | 4/2015 | Morrison | G06F 3/041 174/258 |
| 2015/0177876 A1* | 6/2015 | Ishii | G06F 3/044 345/174 |

* cited by examiner

A-A'

1. Dosing  2. Exposing  3. Purging

TOUCH SCREEN PANEL, DISPLAY DEVICE, AND MANUFACTURING METHOD THEREOF

CROSS-REFERENCE TO RELATED APPLICATION

This application claims priority from and the benefit of Korean Patent Application No. 10-2015-0009466, filed on Jan. 20, 2015, which is hereby incorporated by reference for all purposes as if fully set forth herein.

BACKGROUND

Field

Exemplary embodiments of the present invention relate to a display device and a manufacturing method thereof, and more particularly, to a touch screen panel, a display device, and a manufacturing method thereof.

Discussion of the Background

A touch screen panel may be an input device for allowing an instruction appearing on a screen of an image display device to be selected by a user's hand or an object, to thereby input a user command. A touch screen panel may be provided on a front face of the image display device and convert a contact position directly contacted by a user's hand or an object into an electrical signal, such that an instruction selected in the contact position is received as an input signal. The touch screen panel may replace an input device connected to, and operate in, the image display device, such as a keyboard or a mouse.

Schemes of a touch screen panel may include a resistive scheme, a photosensing scheme, capacitive scheme, and the like. In a capacitive touch screen panel, a conductive sensing electrode may sense a change in capacitance formed with other sensing electrodes thereaournd, a ground electrode, or the like, to convert a contact position into an electrical signal. Thus, the capacitive touch screen panel includes electrically connected sensing electrodes, such as alternately arranged sensing electrodes.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a touch screen panel including a polymer layer that includes a conductive material or a dielectric material infiltrated therein.

Additional aspects will be set forth in the detailed description which follows, and, in part, will be apparent from the disclosure, or may be learned by practice of the inventive concept.

According to an exemplary embodiment of the present invention, a touch screen panel includes first electrode patterns disposed in a first direction, first connection patterns electrically connecting the first electrode patterns, second electrode patterns disposed in a second direction intersecting the first direction and insulated from the first electrode patterns, insulating patterns disposed on the first connection patterns, and second connection patterns disposed on the insulating patterns and electrically connecting the second electrode patterns, in which at least one of the first electrode patterns, the first connection patterns, the second electrode patterns, and the second connection patterns include a first polymer layer including a conductive material infiltrated therein, and the insulating patterns comprise a second polymer layer comprising a dielectric material infiltrated therein.

Each of the first and second polymer layers may include at least one of photoresist, a polyvinyl alcohol, polyamide, polyester, polycarbonate, polymethyl methacrylate, and polyethylene oxide.

The conductive material may include nickel sulfide (NiS), and the dielectric material may include aluminum oxide ($AlO_x$).

The conductive material or the dielectric material may be chemically adsorbed to a surface of a free volume disposed in the first or second polymer layer, respectively.

According to an exemplary embodiment of the present invention, a display device includes a first conductive layer, a second conductive layer disposed on the first conductive layer, and an insulating layer disposed between the first conductive layer and the second conductive layer, in which at least one of the first conductive layer, the insulating layer, and the second conductive layer includes a polymer layer including a conductive material or a dielectric material infiltrated therein.

The first conductive layer may extend in a first direction, the second conductive layer may extend in a second direction intersecting the first direction, and the insulating layer may be disposed in an intersection region of the first conductive layer and the second conductive layer.

The first conductive layer may include a first sensing electrode of a touch screen panel, and the second conductive layer may include a second sensing electrode of a touch screen panel.

According to an exemplary embodiment of the present invention, a method for manufacturing a touch screen panel includes forming a first conductive pattern on a substrate, forming an insulating pattern on the first conductive pattern, and forming a second conductive pattern on the insulating pattern, in which forming at least one of the first conductive pattern, the insulating pattern, and the second conductive pattern includes infiltrating a conductive material or a dielectric material into a polymer pattern of the at least one of the first conductive pattern, the insulating pattern, and the second conductive pattern.

The first conductive pattern may include first sensing electrodes disposed in a first direction, first connection patterns electrically connecting the first sensing electrodes, and second sensing electrodes disposed in a second direction intersecting the first direction and insulated from the first sensing electrodes, and the second conductive pattern includes second connection patterns electrically connecting the second sensing electrodes.

The insulating pattern may be disposed on the first connection pattern.

Infiltrating the conductive material or the dielectric material into the polymer pattern may include dosing a source gas into a chamber in which the substrate has been loaded, exposing the substrate to the source gas, such that the source gas is diffused and adsorbed to a free volume of the polymer pattern, and purging the source gas which has not adsorbed to the polymer pattern.

Dosing the source gas, diffusing and adsorbing the source gas, and the purging the source gas may be repeatedly performed.

The conductive material or the dielectric material may be chemically adsorbed to a surface of a free volume of the polymer pattern.

Infiltrating the conductive material or the dielectric material may include loading at least one substrate in a single chamber.

The source gas may include trimethyl aluminum (TMA).

A flow rate of the source gas may be in the range of 50 to 500 sccm, a temperature of the chamber may be in the range of 50° C. to 150° C., and a pressure of the chamber may be in the range of 0.1 to 10 torr.

The source gas may further include $H_2O$ gas.

The conductive material or the dielectric material may be diffused into the polymer pattern in the range of 50 nm to 300 nm.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
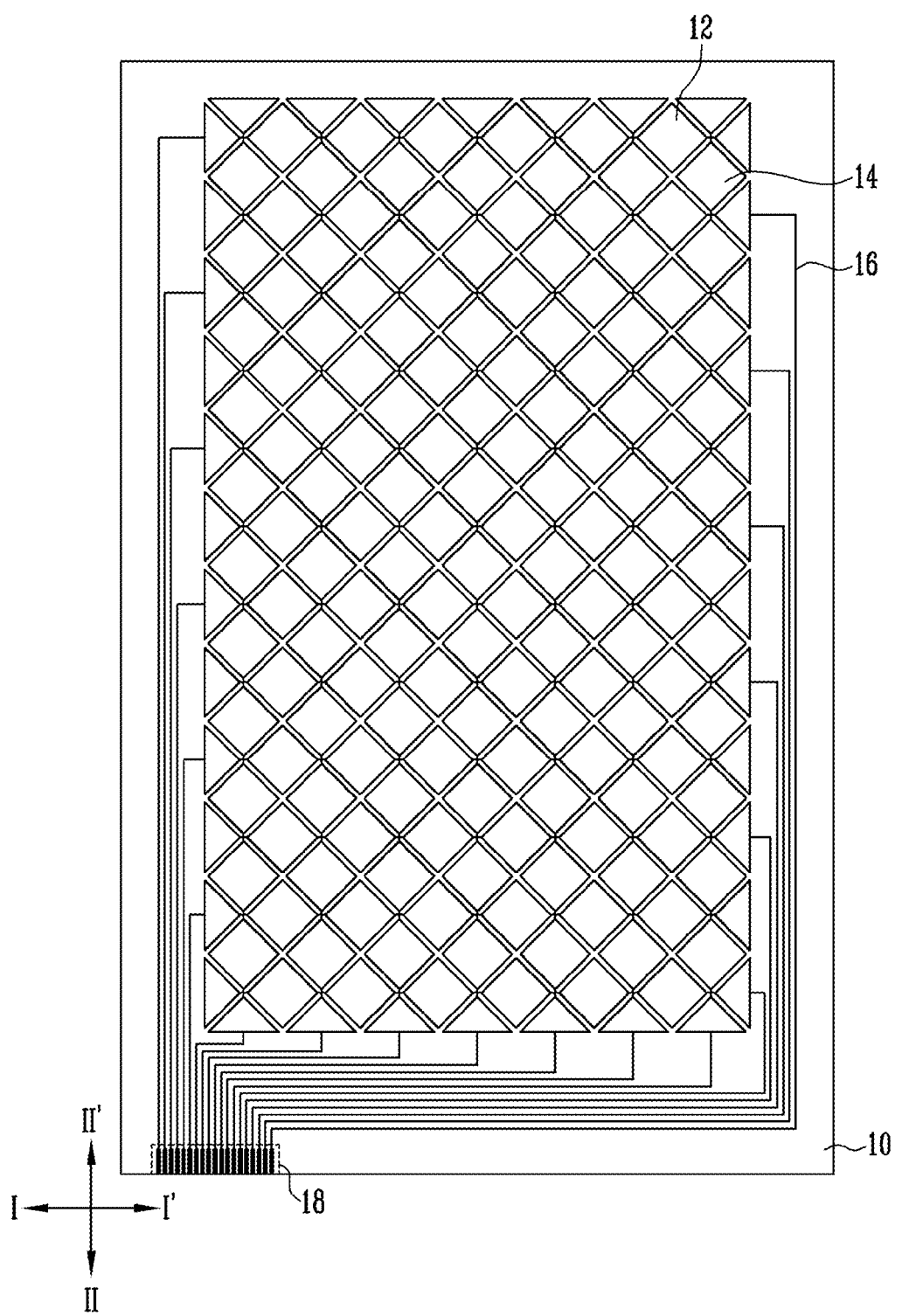
FIG. 1 is a plan view illustrating a touch screen panel according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a plan view illustrating a touch screen panel according to an exemplary embodiment of the present invention.

Referring to FIG. 1, a touch screen panel according to the present exemplary embodiment includes a substrate 10, sensing electrodes 12 and 14, and sensing lines 16 electrically connected to the sensing electrodes 12 and 14, and a pad unit 18.

The substrate 10 includes an active touch region and an inactive touch region disposed in an outer side of the active touch region. The active touch region is a region in which a touch position is detected and a display region in which an image is displayed. The active touch region may overlap pixels provided in a display panel (not shown) disposed below the touch screen panel. The inactive touch region may be a non-display region for not displaying an image. The sensing electrodes 12 and 14 include first sensing electrodes 12 and second sensing electrodes 14, which are alternately disposed. The first sensing electrodes 12 are arranged in a first direction I-I', and the first sensing electrodes 12 disposed in a single row are electrically connected to each other. The second sensing electrodes 24 are arranged in a second direction II-II' intersecting the first direction I-I', and the second sensing electrodes 14 disposed in a single column are electrically connected to each other. The first sensing electrodes 12 may be patterned in a mutually connected form or electrically connected by a separate connection pattern. The second sensing electrodes 14 arranged in a single column may be patterned in a mutually connected form or connected by a separate connection pattern.

The first sensing electrodes 12 may be disposed in the same layer with the second sensing electrodes 14 or may be disposed in a different layer. According to the present exemplary embodiment, the first and second sensing electrodes 12 and 14 have a diamond structure. Alternatively, the first and second sensing electrodes 12 and 14 may have other forms, such as a metal mesh structure, a circular structure, a triangular bar structure, and the like.

The pad unit 18 includes pads connected to the sensing lines 16. Accordingly, the pads are connected to the first and second sensing electrodes 12 and 14 through the sensing lines 16. The sensing lines 16 connected to the second sensing electrode 14 are connected to the pads arranged in the center of the pad unit 18. The sensing lines 16 connected to the first sensing electrodes 12 are arranged on left and right sides of the active touch region, and connected to the pads arranged on the left and right sides of the pad unit 18. Alternatively the pad unit 18 may be disposed in the center of the inactive touch region.

When a contact object such as a user's hand or a touch stick contacts the touch screen panel, a change in capacitance according to a contact position is transmitted to a driving circuit (not shown) by the first and second sensing electrodes 12 and 14, the sensing lines 16, and the pad unit 18. As the change in capacitance is converted into an electrical signal by a signal input processing circuit (not shown), or the like, the contact position may be recognized.

Figure 2A:
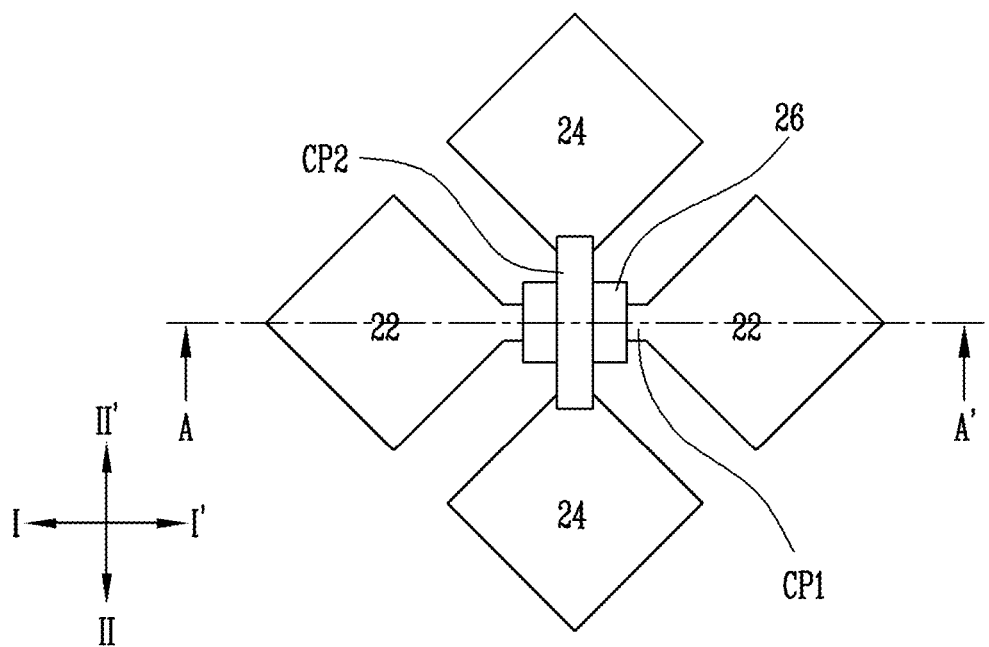
FIGS. 2A and 2B are a plan view and a cross-sectional view of sensing electrodes of the touch screen panel according to an exemplary embodiment of the present invention.
Figure 2B:
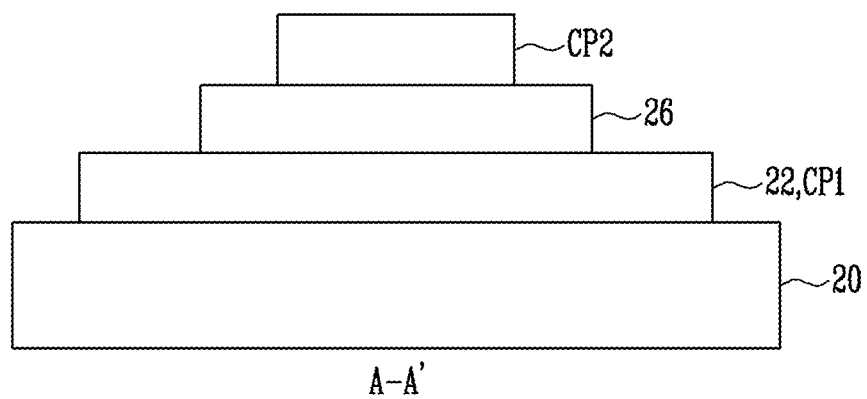

FIGS. 2A and 2B are a plan view and a cross-sectional view illustrating a structure of sensing electrodes of a touch screen panel according to an exemplary embodiment of the present invention. FIG. 2B is a cross-sectional view taken along line A-A' of FIG. 2A.

Referring to FIGS. 2A and 2B, first and second electrode patterns 22 and 24 are arranged on a substrate 20. The first electrode patterns 22 are arranged in a first direction I-I' and connected by first connection patterns CP1. The first electrode patterns 22 and the first connection patterns CP1 may be formed and connected by a single layer. The second electrode patterns 24 are arranged in a second direction II-IF and are insulated from the first electrode patterns 22. The second electrode patterns 24 may be disposed at the same height with the first electrode patterns 22.

Insulating patterns 26 are disposed on the first connection patterns CP1, and second connection patterns CP2 are disposed on the insulating patterns 26. The second connection patterns CP2 electrically connect the second electrode patterns 24 neighboring in the second direction II-II'. Thus, the insulating patterns 26 are interposed between the first electrode patterns 22 and the second electrode patterns 24, and the first electrode patterns 22 and the second electrode patterns 24, are insulated by the insulating patterns 26.

The first electrode patterns 22, the second electrode patterns 24, the first connection patterns CP1, and the second connection patterns CP2 include a polymer layer, in which a conductive material is infiltrated and adsorbed to an internal free volume of the polymer layer. The insulating patterns 26 may include a polymer layer, in which a dielectric material is infiltrated and adsorbed to an internal free volume of the polymer layer. The polymer layer may include photoresist, a polyvinyl alcohol, polyamide, polyester, polycarbonate, polymethyl methacrylate, polyethylene oxide, and the like. The conductive material and the dielectric material may include an inorganic material. The conductive material may include nickel sulfide (NiS), and the dielectric material may include aluminum oxide ($AlO_x$).

According to the present exemplary embodiment, the first sensing electrodes of the touch screen panel may be disposed on the same layer with the second sensing electrodes. According to an exemplary embodiment of the present invention, the structure illustrated with reference to FIGS. 2A and 2B may be applied to a display device, a semiconductor device, and the like. For example, the polymer layer, which includes a conductive material or an organic material infiltrated and adsorbed therein, may be applied to an element including a conductive layer and an insulating layer, such as a transistor, a capacitor, a register, and the like.

Figure 3A:
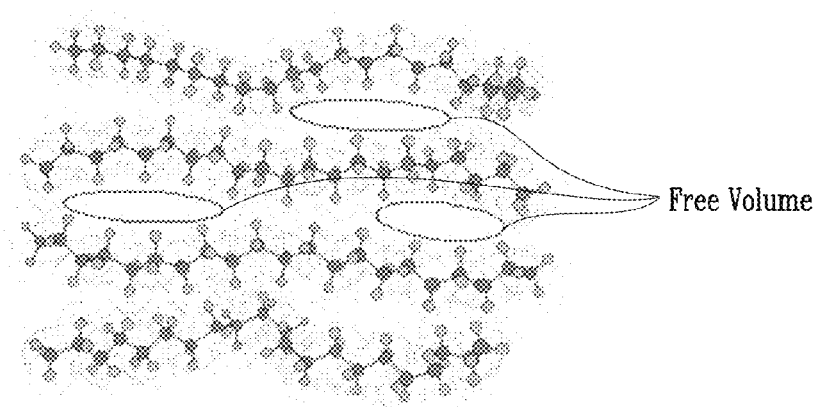
FIGS. 3A and 3B are schematic views illustrating a principle of sequential vapor infiltration (SVI) according to an exemplary embodiment of the present invention.
Figure 3B:
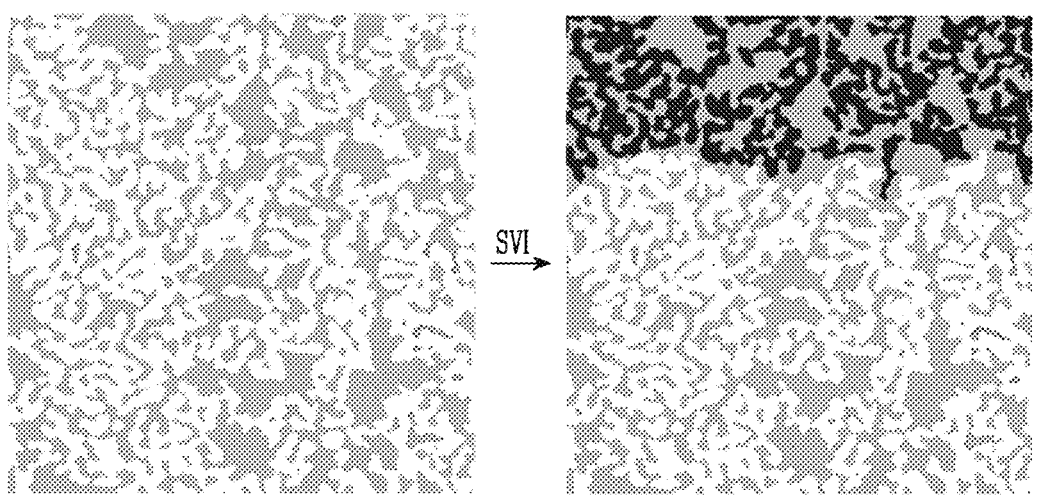

FIGS. 3A and 3B are schematic views illustrating a principle of sequential vapor infiltration (SVI) according to an exemplary embodiment of the present invention.

Referring to FIG. 3A, a polymer layer has a chain structure, and free volumes exist between chains. Referring to FIG. 3B, the free volumes of a surface of the polymer layer are filled according to the SVI.

The SVI according to the present exemplary embodiment provides an inorganic material to be infiltrated and adsorbed to the free volumes of the polymer layer. Thus, the polymer layer may have conductivity or insulating properties according to an adsorbed material, while having mechanical flexibility of a polymer material.

A deposition method such as an atomic layer deposition (ALD), or the like, may deposit a material on a surface of a polymer layer. Accordingly, an interface may exist between two materials that may cause stress between the heterogeneous materials. The SVI according to the present exemplary embodiment adsorbs an inorganic material to the interior of the free volumes. Accordingly, an interface may not be formed between heterogeneous materials, thereby generating an organic-inorganic composite material without stress. More particularly, the interior and an external surface of the polymer layer may be bulk-modified.

Figure 4A:
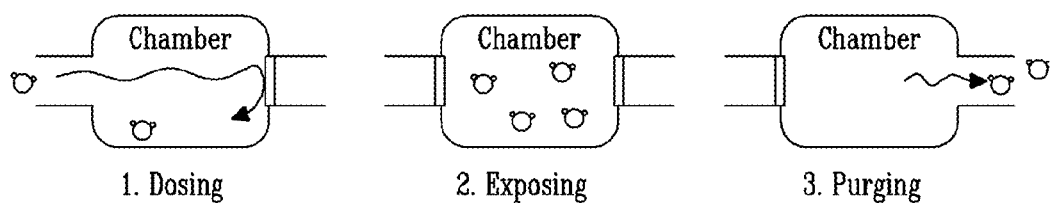
FIGS. 4A and 4B are views illustrating order of the SVI according to an exemplary embodiment of the present invention.
Figure 4B:
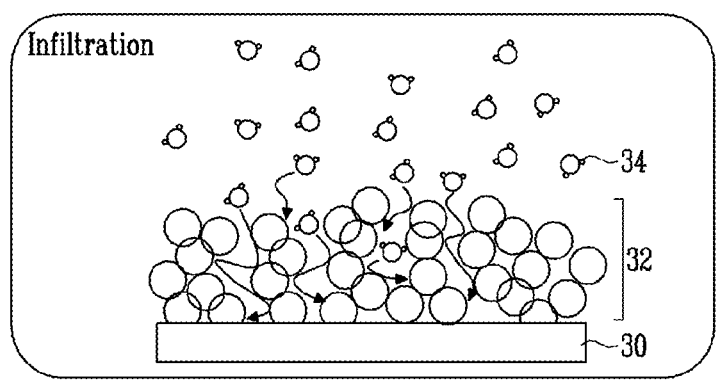

FIGS. 4A and 4B are views illustrating the SVI according to an exemplary embodiment of the present invention.

First, a source gas is dosed into a chamber in which a substrate including a polymer layer has been loaded. Accordingly, the interior of the chamber is filled with the source gas.

Next, the substrate including the polymer layer is exposed to the source gas. Accordingly, the source gas infiltrates into the polymer layer, is diffused into free volumes, and adsorbed to surfaces of the free volumes. Referring to FIG. 4B, a polymer layer 32 is disposed on the substrate 30, and paths along which a source gas 34 infiltrated into the polymer layer 32 are diffused through the free volumes are illustrated.

When surfaces of the free volumes of the polymer layer have relatively high reactivity, an inorganic material included in the source gas may be chemically adsorbed to the surfaces of the free volumes. For example, in the case of polyvinyl alcohol, polyamide, polyester, polycarbonate, polyemethyl methacrylate, and polyethylene oxide, an inorganic material is chemically adsorbed to the surfaces of the free volumes. Also, when the free volumes of the polymer layer have relatively low reactivity, the inorganic material included in the source gas may be physically adsorbed to the surfaces of the free volumes. For example, in the case of polyethylene, an inorganic material is physically adsorbed to the surfaces of the free volumes.

Subsequently, the source gas remaining within the chamber that has not been adsorbed to the interior of the polymer layer is purged. Accordingly, the SVI is completed. The dosing, exposing, and purging process may be repeatedly performed several times according to types of a layer to be formed.

According to an exemplary embodiment of the present invention, a method for forming a polymer layer having insulating properties by infiltrating and adsorbing aluminum oxide ($Al_2O_3$) into the polymer layer including polyvinyl alcohol (PVA) using the SVI will be described.

First, a substrate including a polymer layer including PVA is loaded into a chamber, and trimethyl aluminum (TMA) gas, a source gas, is subsequently supplied to the interior of the chamber. Here, a flow rate of the TMA gas may be in the range of 50 to 500 sccm, a temperature may be in the range of 50° C. to 150° C., and pressure may be in the range of 0.1 to 10 torr. Thereafter, the polymer layer is exposed to the TMA gas, and the TMA gas is diffused to free volumes within the polymer layer. Subsequently, the TMA gas reacts with an —OH group included present on surfaces of the free volumes and adsorbed as —O—Al(CH$_3$)$_2$. Subsequently, TMA gas which has not been adsorbed but remains within the chamber is purged to outside of the chamber.

Thereafter, the interior of the chamber is filled with $H_2O$ gas (water vapor). When the polymer layer is exposed to the $H_2O$ gas, the $H_2O$ gas is diffused to the free volumes within the polymer layer. Here, a flow rate of the $H_2O$ gas may be in the range of 50 to 500 sccm, a temperature of the $H_2O$ gas may range be in the range of 50° C. to 150° C., and pressure of the $H_2O$ gas may range be in the range of 0.1 torr to 10 torr.

Thereafter, the $H_2O$ gas reacts with —O—Al(CH$_3$)$_2$ present on the surfaces of the free volumes and is adsorbed as —O—Al(OH)$_2$. Subsequently, $H_2O$ gas which has not been adsorbed but remaining within the chamber is purged to outside of the chamber. Thus, $Al_2O_3$ infiltrates with a thickness ranging from 50 nm to 300 nm to the interior of the PVA polymer layer, and an organic-inorganic composite thin film having a thickness ranging from 50 nm to 300 nm is formed. According to the method of forming a polymer layer described above, as the inorganic material is infiltrated to be adsorbed to the interior of the free volumes of the polymer layer, the polymer layer may have conductivity or insulating properties.

FIGS. 5A, 5B, 5C, 5D, 5E, and 5F are cross-sectional views illustrating a method for manufacturing a touch screen panel according to an exemplary embodiment of the present invention.

Figure 5A:
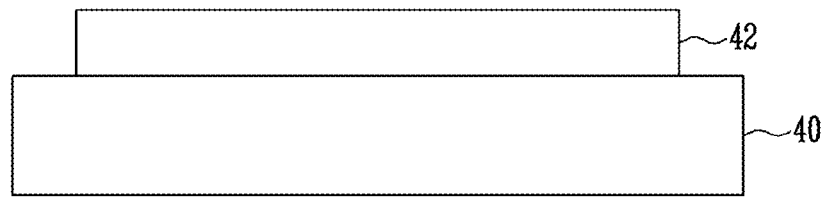
FIGS. 5A, 5B, 5C, 5D, 5E, and 5F are cross-sectional views illustrating a method for manufacturing a touch screen panel according to an exemplary embodiment of the present invention.

Referring to FIG. 5A, a first polymer pattern 42 is formed on a substrate 40. A first polymer layer such as photoresist is formed on the substrate 40 and etched to form the first polymer pattern 42. The first polymer pattern 42 is formed to have a shape substantially the same as a shape of a first conductive pattern desired to be formed. For example, the first polymer pattern 42 may have a diamond shape, a metal mesh shape, a circular shape, a triangular bar shape, and the like.

Figure 5B:
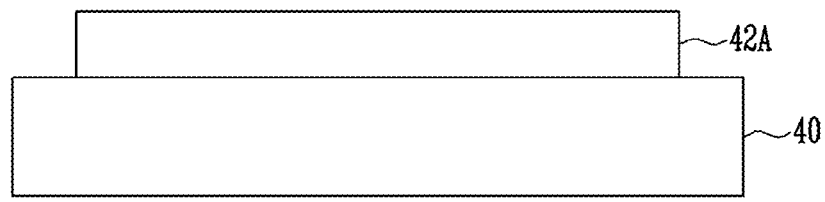

Referring to FIG. 5B, a conductive material infiltrates into the first polymer pattern 42 by using the SVI. Accordingly, the conductive material infiltrates to be adsorbed to the free volumes between the chains of the first polymer pattern 42, to form a first conductive pattern 42A. Referring back to FIG. 2A, the first conductive pattern 42A includes first electrode patterns arranged in the first direction, first connection patterns electrically connecting the first electrode patterns, and second electrode patterns arranged in the second direction intersecting the first direction and insulated from the first electrodes.

Figure 5C:
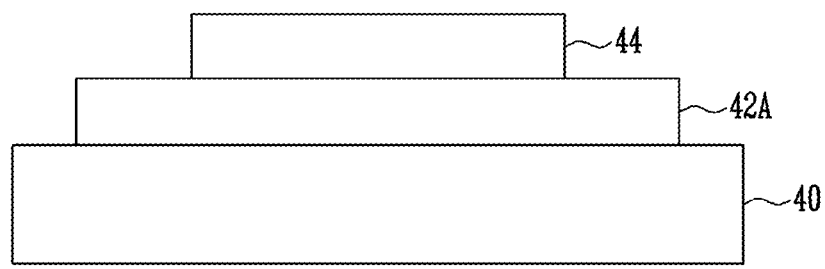

Referring to FIG. 5C, a second polymer pattern 44 is formed on the first conductive pattern 42A. A second polymer layer such as photoresist, or the like, may be formed on the substrate 40 with the first conductive pattern 42A formed thereon and subsequently etched to form the second polymer pattern 44. The second polymer pattern 44 is formed to have a shape substantially the same as a shape of an insulating pattern desired to be formed. For example, the second polymer pattern 44 may be formed as an island disposed on the first connection patterns.

Figure 5D:
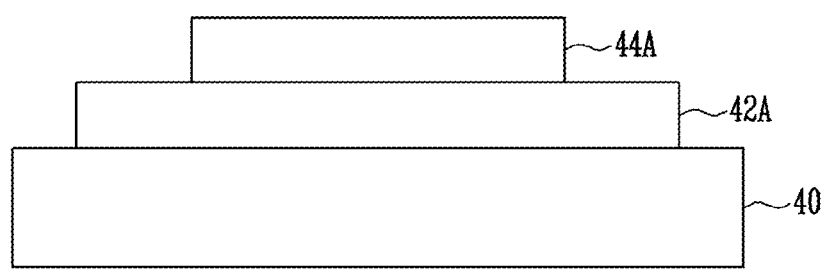

Referring to FIG. 5D, a dielectric material infiltrates into the second polymer pattern 44 using the SVI. Accordingly, the dielectric material infiltrates to be adsorbed to the free volumes between the chains of the second polymer pattern 44, forming an insulating pattern 44A. The insulating pattern 44A may insulate a second conductive pattern to be formed from the first conductive pattern 42A.

Figure 5E:
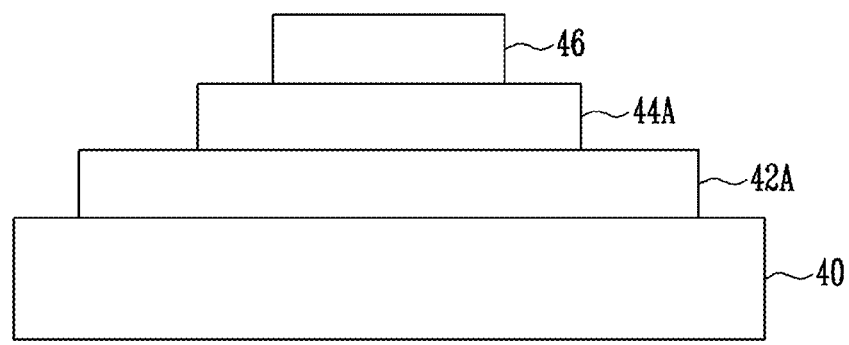

Referring to FIG. 5E, a third polymer pattern 46 is formed on the insulating pattern 44. A third polymer layer such as photoresist, or the like, is formed on the insulating pattern 44 and subsequently etched to from the third polymer pattern 46. The third polymer pattern 46 has a shape substantially the same as a shape of the second conductive pattern desired to be formed. The third polymer pattern 46 is disposed on the insulating pattern 44A and formed as an island connecting the second electrode patterns arranged in the second direction.

Figure 5F:
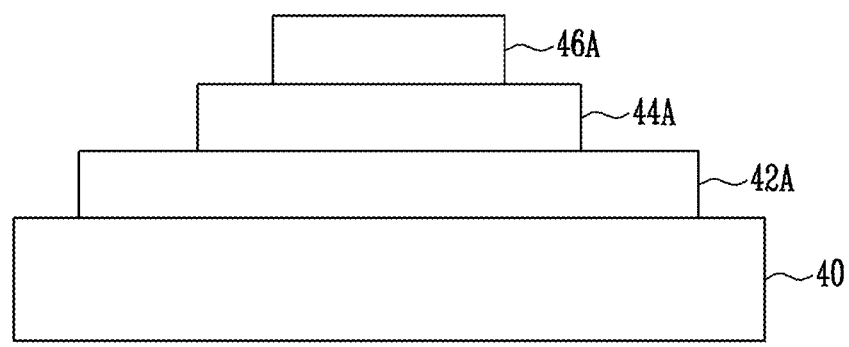

Referring to FIG. 5F, a conductive material infiltrates into the third polymer pattern 46 using the SVI. Accordingly, the conductive material infiltrates to be adsorbed to the free volumes between the chains of the third polymer pattern 46, forming a second conductive pattern 46A. The second conductive pattern 46A is insulated from the first conductive pattern 42A by the insulating pattern 44.

According to the manufacturing method of the present exemplary embodiment described above, the polymer pattern having conductivity or the polymer pattern having insulating properties may be formed using the SVI, which may reduce the number of masks used and manufacturing costs in the manufacturing process as compared to the conventional method of forming a conductive layer or an insulating layer according to a deposition scheme. Also, since the polymer pattern maintains the characteristics of the polymer, mechanical flexibility of the layer may increase as compared to the conventional conductive layer or insulating layer.

Also, the manufacturing method of the present exemplary embodiment may be applied to manufacturing a semiconductor device, a display device, and the like, such as a transistor, a capacitor, a resistor, and the like. When manufacturing a capacitor according to the present exemplary embodiment, the first conductive pattern 42A may be a lower electrode, the insulating pattern 44A may be a dielectric layer, and the second conductive pattern 46A may be an upper electrode.

Figure 6:
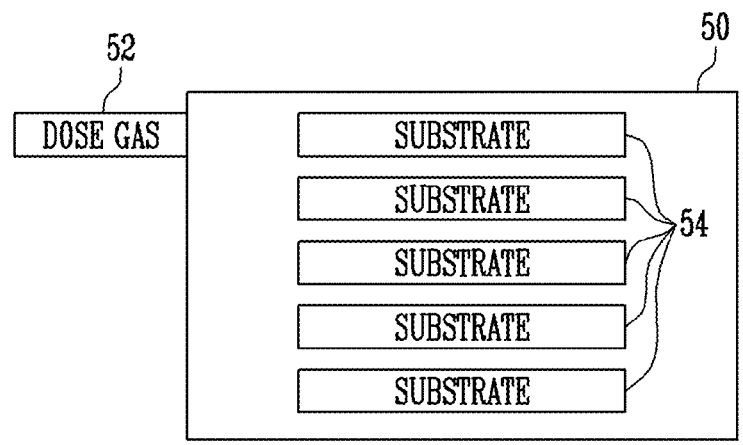
FIG. 6 is a view illustrating a structure of a chamber according to an exemplary embodiment of the present invention.

FIG. 6 is a view illustrating a structure of a chamber according to an exemplary embodiment of the present invention. Referring to FIG. 6, multiple substrates 54 are disposed within a single chamber 50. Thus, an inorganic material may simultaneously infiltrate into the polymer layers formed on the substrates 54.

Conventional deposition methods, such as sputtering, chemical vapor deposition, and the like, may require the substrates be disposed below source units. Accordingly, simultaneously depositing multiple substrates may not be possible once the multiple substrates are loaded in the chamber.

According to the SVI of the present exemplary embodiment, a source gas is dosed into the chamber and the polymer pattern is exposed to the source gas, whereby an inorganic material may infiltrate into the polymer pattern. Accordingly, multiple substrates may be loaded on the single chamber, to reduce manufacturing costs.

A capacitive touch screen pattern includes electrically connected sensing electrodes, and the sensing electrodes are alternately arranged. However, a patterning process should be repeatedly performed using masks to form the sensing electrodes, which complicates the manufacturing process and increases manufacturing costs.

According to an exemplary embodiment of the present invention, a conductive layer or an insulating layer is formed by infiltrating and adsorbing a conductive material or an organic material to a polymer layer. Thus, the conductive layer or the insulating layer may have properties of an inorganic material such as conductivity or insulating properties, while maintaining physical properties such as mechanical flexibility of the polymer layer. A layer formed using the SVI may not have an interface between heterogeneous materials, thus providing a stable organic-inorganic composite material without stress. Also, since the number of masks used may be reduced during the manufacturing process, the manufacturing process may be simplified and manufacturing costs may be reduced.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A touch screen panel, comprising;
first electrode patterns disposed in a first direction;
first connection patterns electrically connecting the first electrode patterns;
second electrode patterns disposed in a second direction intersecting the first direction and insulated from the first electrode patterns;
insulating patterns disposed on the first connection patterns; and
second connection patterns disposed on the insulating patterns and electrically connecting the second electrode patterns,
wherein:
at least one of the first electrode patterns, the first connection patterns, the second electrode patterns, and the second connection patterns comprise a first polymer layer comprising a conductive material infiltrated therein;
the insulating patterns comprise a second polymer layer comprising a dielectric material infiltrated therein;
at least one of the conductive material and the dielectric material is infiltrated into 50 nm to 300 nm of the corresponding polymer layer; and
the conductive material or the dielectric material is chemically adsorbed to a surface of a free volume disposed in the first or second polymer layer, respectively.

2. The touch screen panel of claim 1, wherein each of the first and second polymer layers comprise at least one of photoresist, a polyvinyl alcohol, polyamide, polyester, polycarbonate, polymethyl methacrylate, and polyethylene oxide.

3. The touch screen panel of claim 1, wherein:
the conductive material comprises nickel sulfide (NiS); and
the dielectric material comprises aluminum oxide ($AlO_x$).

4. The touch screen panel of claim 1, wherein the other one of the conductive material and the dielectric material is infiltrated into 50 nm to 300 nm of the corresponding polymer layer.

5. A display device, comprising:
a first conductive layer;
a second conductive layer disposed on the first conductive layer; and
an insulating layer disposed between the first conductive layer and the second conductive layer,
wherein:
at least one of the first conductive layer, the insulating layer, and the second conductive layer comprises a polymer layer comprising a conductive material or a dielectric material infiltrated therein; and
at least one of the conductive material and the dielectric material is infiltrated into 50 nm to 300 nm of the polymer layer;
the polymer layer comprises at least one of photoresist, a polyvinyl alcohol, polyamide, polyester, polycarbonate, polymethyl methacrylate, and polyethylene oxide; and
the conductive material or the dielectric material is chemically adsorbed to a surface of a free volume disposed in the polymer layer.

6. The display device of claim 5, wherein:
the first conductive layer extends in a first direction;

the second conductive layer extends in a second direction intersecting the first direction; and the insulating layer is disposed in a intersection region of the first conductive layer and the second conductive layer.

7. The display device of claim 6, wherein:

the first conductive layer comprises a first sensing electrode of a touch screen panel; and the second conductive layer comprises a second sensing electrode of the touch screen panel.

8. A method for manufacturing a touch screen panel, the method comprising;

forming a first conductive pattern on a substrate;

forming an insulating pattern on the first conductive pattern;

forming a second conductive pattern on the insulating pattern;

dosing a source gas into a chamber in which the substrate has been loaded;

exposing the substrate to the source gas, such that a conductive material or a dielectric material of the source gas is diffused and adsorbed to a free volume of a polymer pattern of at least one of the first conductive pattern, the insulating pattern, and the second conductive pattern; and purging the source gas in the chamber which has not been adsorbed to the polymer pattern.

9. The method of claim 8, wherein:

the first conductive pattern comprises:

first sensing electrodes disposed in a first direction;

first connection patterns electrically connecting the first sensing electrodes; and second sensing electrodes disposed in a second direction intersecting the first direction and insulated from the first sensing electrodes; and the second conductive pattern comprises second connection patterns electrically connecting the second sensing electrodes.

10. The method of claim 9, wherein the insulating pattern is disposed on the first connection pattern.

11. The method of claim 8, wherein dosing the source gas, diffusing and adsorbing the source gas, and purging the source gas are repeatedly performed.

12. The method of claim 11, wherein the source gas comprises trimethyl aluminum (TMA).

13. The method of claim 12, wherein:

a flow rate of the source gas is in the range of 50 to 500 sccm;

a temperature of the chamber is in the range of 50° C. to 150° C.; and a pressure of the chamber is in the range of 0.1 to 10 torr.

14. The method of claim 13, wherein the source gas further comprises $H_2O$ gas.

15. The method of claim 8, wherein the conductive material or the dielectric material is chemically adsorbed to a surface of a free volume of the polymer pattern.

16. The method of claim 8, wherein the conductive material or the dielectric material is diffused into the polymer pattern in the range of 50 nm to 300 nm.

17. A method for manufacturing a touch screen panel, the method comprising:

forming a first conductive pattern on a substrate;

forming an insulating pattern on the first conductive pattern; and forming a second conductive pattern on the insulating pattern, wherein forming at least one of the first conductive pattern, the insulating pattern, and the second conductive pattern comprises infiltrating a conductive material or a dielectric material into a polymer pattern of the at least one of the first conductive pattern, the insulating pattern, and the second conductive pattern by loading at least one substrate in a single chamber.

18. The method of claim 17, wherein:

the first conductive pattern comprises:

first sensing electrodes disposed in a first direction;

first connection patterns electrically connecting the first sensing electrodes; and second sensing electrodes disposed in a second direction intersecting the first direction and insulated from the first sensing electrodes; and the second conductive pattern comprises second connection patterns electrically connecting the second sensing electrodes.

19. The method of claim 18, wherein the insulating pattern is disposed on the first connection pattern.

20. The method of claim 17, wherein the conductive material or the dielectric material is diffused into the polymer pattern in the range of 50 nm to 300 nm.

\* \* \* \* \*